United States Patent Office 3,015,274
Patented Jan. 2, 1962

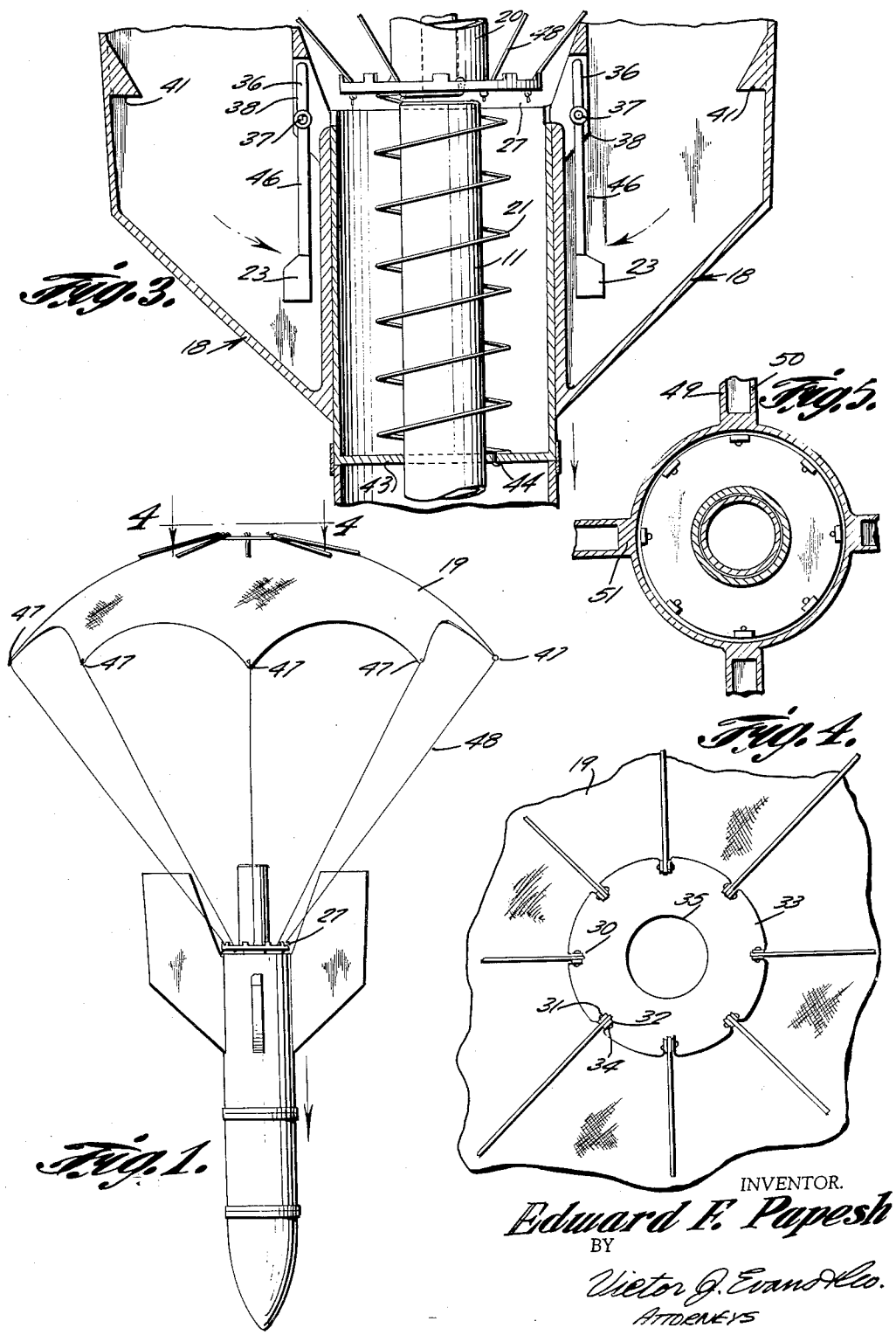

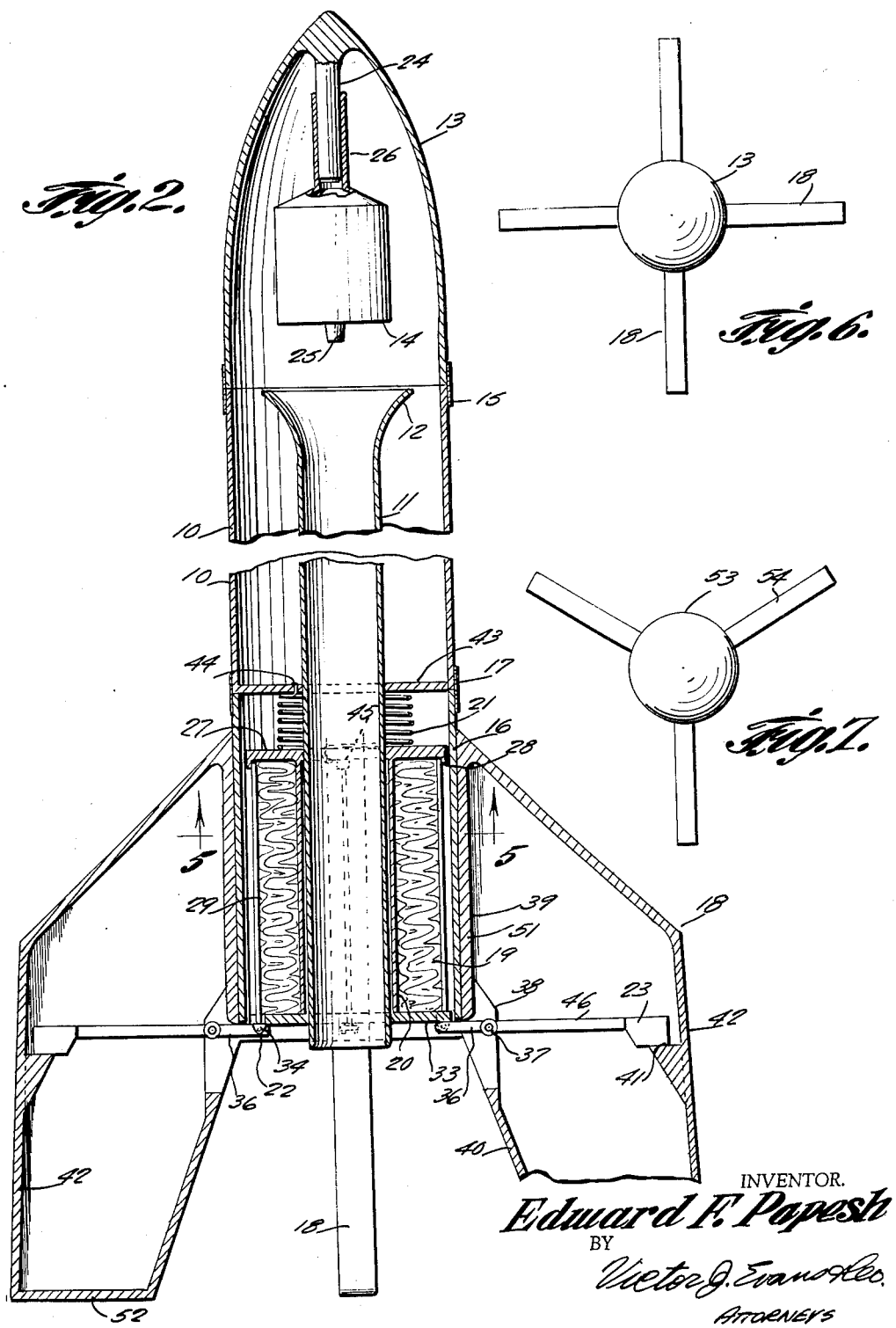

3,015,274
MODEL ROCKET AND PARACHUTE ASSEMBLY
Edward F. Papesh, 1504 Theodore St., Joliet, Ill.
Filed Dec. 16, 1959, Ser. No. 859,925
3 Claims. (Cl. 102—34.1)

This invention relates to rockets of the sectional type having a nose removably connected to a body and having a parachute removably connected to the opposite end of the body, and in particular a cylindrical body having an augmenter tube extended therethrough with a nose having an engine therein secured by tape or the like to the body and with a parachute retained in a fin or tail section by weight actuated fingers and mounted to be ejected by a spring when released by the fingers as the rocket assumes an inverted position.

The purpose of this invention is to provide means for forming a sectional rocket and also a rocket that is recovered by a parachute.

Various types of sectional rockets have been provided and although some of these use jet propelling means, it is difficult in a rocket of this type to include a parachute wherein the parachute remains in a folded position until the rocket starts its return travel.

With this thought in mind this invention contemplates a rocket having a jet engine in the nose with the engine positioned to discharge into an augmenter tube in the intermediate part of the rocket and with a parachute positioned around the augmenter tube and mounted to be discharged as the rocket assumes an inverted position.

The object of this invention is, therefore, to provide a toy rocket in which a parachute opens automatically as the rocket starts its return travel.

Another object of the invention is to provide a toy rocket in which the rocket is recovered by a parachute.

Another important object of the invention is to provide a sectional toy rocket wherein the sections are connected by adhesive tape making it possible to readily separate the sections for recharging or resetting the parts.

A further object of the invention is to provide a sectional rocket having a jet engine and a parachute incorporated therein in which the rocket is of a simple and economical construction.

With these and other objects and advantages in view the invention embodies a nose having a jet engine therein, a tubular body having an augmenter tube therein and positioned with the augmenter tube arranged to receive the discharge of the jet engine, and a tail section having a parachute folded therein and having weight actuated fingers pivotally mounted in fins extended from the outer surface whereby the weights actuate the fingers to release the parachute as the rocket assumes an inverted position.

Other features and advantages of the invention will appear from the following description taken in connection with the drawings, wherein:

FIGURE 1 is a side elevational view showing the rocket in an inverted or returning position.

FIGURE 2 is a vertical section through the rocket with the parts assembled and with the parts shown on an enlarged scale.

FIGURE 3 is a vertical section through the tail portion of the rocket showing the parts inverted and in the position of discharging the parachute, parts being broken away and the parts also being shown on an enlarged scale.

FIGURE 4 is a plan view, with the parts shown on an enlarged scale showing a disc mounted in the center of the parachute and with parts of the parachute broken away, the section being taken on line 4—4 of FIGURE 1.

FIGURE 5 is a cross section taken on line 5—5 of FIGURE 2 looking upwardly and showing the disc illustrated in FIGURE 4 nested in the tail section of the rocket.

FIGURE 6 is a plan view looking toward the nose of the rocket showing the rocket having four fins.

FIGURE 7 is a similar view also looking towards the nose of the rocket showing a modification wherein the rocket is provided with three fins.

Referring now to the drawings wherein like reference characters denote corresponding parts the improved rocket of this invention includes a cylindrical body 10 having an augmenter tube 11 mounted therein and having an outwardly flared upper end 12, a nose 13 having a jet engine 14 therein secured to the upper end of the body 10 by suitable means, such as a strip of adhesive tape 15 and a tail section 16 secured to the lower end of the body 10 by a strip of material such as adhesive tape 17 and the tail section 16 having fins 18 extended from the outer surface and a parachute 19 folded around a tube 20 slidably mounted on the augmenter tube and having a spring 21 for expelling the parachute when the parachute is released by the fingers 22 which are actuated to releasing positions by weights 23 when the rocket is inverted.

The jet engine 14, which is slidably mounted on a pin 24 extended from the tip of the nose 13 is provided with a nozzle 25 from which gases of combustion are injected into the outwardly flared end 12 of the augmenter tube. The upper end of the engine 14 is provided with a tube 26 that is retained by friction on the pin 24 whereby the engine may readily be removed and replaced.

The upper end of the tube 20, around which the parachute is positioned is provided with a disc 27 having a depending peripheral flange 28 and rods 29, which are pivotally mounted in notches 30 between ears 31 and 32 extended from a disc 33 by pins 34 are positioned with upper ends thereof held by the flange 28. The disc 33 is provided with a center opening 35 through which the augmenter tube 11 extends, as shown in FIGURE 2. The rods 29, which are equally spaced around the parachute assembly retain the parachute in a nested position on the tube 20 preventing contact of the parachute with the inner surface of the wall 16 of the lower section of the rocket.

The fingers 36 which retain the parachute in the nested position in the rocket are pivotally mounted on pins 37 in flanges 38 extended between a sleeve 39 and inner walls 40 of the fins and the fingers are actuated by the weights 23 which rest upon seats 41 positioned on inner surfaces of outer walls 42 of the fins.

The upper end of the spring 21 is connected to a disc or inner wall 43 in the lower end of the body or intermediate section of the rocket, as shown at the point 44. The lower end of the spring 21 is connected to the disc 27 by a bolt 45, as shown in dotted lines in FIGURE 2, and with the parts assembled as illustrated and described the spring 21 drives the parachute assembly outwardly as the rocket is inverted whereby the weights 23 pull the arms 46 downwardly with the fingers 36 moving upwardly, as shown in FIGURE 3. By this means the parachute is ejected upwardly with corners 47 thereof connected by cords 48 to the disc 27.

As illustrated in FIGURE 5 the fins 18 are provided with side walls 49 and 50 and the walls extend from reinforcing sections 51 on the outer surface of the tail section of the rocket. The side walls are connected at the outer edges by the web 42 and, as shown in FIGURE 2, the web 42 extends across lower ends of the fins providing end sections 52.

In the design shown in FIGURE 7 a rocket 53 is provided with fins 54 and it will be understood that as many fins as may be desired may be used.

With the parts assembled as illustrated and described an ignition of the jet engine projects a driving force through the augmenter tube 11 and as the gases are forced from the lower end of the tube 11 the rocket is driven upwardly, continuing in its path until the gases of the jet engine are exhausted. Upon reaching the stall point the weight of the engine in the nose causes the rocket to turn over, starting downwardly with the nose pointing downwardly and the fins upward. In this position the weights 23 drop downwardly moving the fingers 36 upwardly and releasing the disc 33 whereby the spring 21 ejects the parachute assembly so that the parachute opens to the position shown in FIGURE 1 with the rocket depending therefrom. By this means the rocket is recovered and may be reused.

It will be understood that modifications, within the scope of the appended claims, may be made in the design and arrangement of the parts without departing from the spirit of the invention.

What is claimed is:

1. A rocket comprising a tubular nose section, a tubular intermediate section, means for temporarily connecting the nose section to the intermediate section, a tail section having fins extended therefrom, means for temporarily attaching the tail section to the intermediate section, a parachute assembly positioned in said tail section, a spring in the tail section for urging the parachute assembly from said tail section, and a plurality of gravity actuated fingers for retaining the parachute assembly in said tail section until the position of the rocket is inverted.

2. In a rocket, the combination which comprises a tubular body providing an intermediate section, a nose section positioned on one end of the body, a tail section positioned on the opposite end of the body, means for temporarily retaining the sections in assembled relation, an augmenter tube mounted in the intermediate section and extended through the tail section, a jet engine mounted in the nose section and positioned to discharge into the augmenter tube, a parachute assembly extended around the augmenter tube and positioned in the tail section, a spring for urging the parachute assembly from said tail section, and fingers pivotally mounted in the fins, positioned to retain the parachute assembly in the tail section while the rocket is in an upright position, said fingers being mounted to be actuated by gravity to release the parachute assembly when the position of the rocket is inverted.

3. In a rocket assembly, the combination which comprises a tubular body, a tubular nose positioned on the upper end of the tubular body, a strip of adhesive tape for securing the tubular nose to the tubular body, a tail section positioned below the tubular body, a strip of adhesive tape for temporarily securing the tail section to the tubular body, an augmenter tube extended through the tubular body and tail section, a jet engine positioned in the nose for discharging into the augmenter tube, a parachute assembly in the tail section and extended around the augmenter tube, radially disposed fins extended from said tail section, fingers pivotally mounted in the fins and positioned with ends thereof extended into the path of the parachute for retaining the parachute in the tail section, a spring for urging the parachute from the tail section, and weights on ends of the fingers for actuating the fingers to release the parachute assembly upon inverting of the rocket.

References Cited in the file of this patent
UNITED STATES PATENTS

| | | |
|---|---|---|
| 2,043,268 | Skinner | June 9, 1936 |
| 2,494,562 | Kessenich | Jan. 17, 1950 |
| 2,588,184 | Walsh | Mar. 4, 1952 |
| 2,675,642 | Coleman et al. | Apr. 20, 1954 |
| 2,756,538 | Corbett | July 31, 1956 |